(12) United States Patent
Hsiao et al.

(10) Patent No.: US 11,783,406 B1
(45) Date of Patent: Oct. 10, 2023

(54) METHOD AND MEDIUM FOR LEVERAGING INFORMATION ABOUT PRIOR ORDERS FROM VARIOUS USERS ASSOCIATED WITH AN ACCOUNT WHEN RECEIVING AN ORDER FROM A USER ASSOCIATED WITH THE ACCOUNT

(71) Applicant: Maplebear, Inc., San Francisco, CA (US)

(72) Inventors: Daniel Hsiao, San Francisco, CA (US); Jason Scott, San Francisco, CA (US); Matthew Brooks, Petaluma, CA (US); Rohan Salantry, Walnut Creek, CA (US); Daniel Shilov, San Francisco, CA (US); Christos Christoudias, San Francisco, CA (US)

(73) Assignee: Maplebear, Inc., San Francisco, CA (US)

( * ) Notice: Subject to any disclaimer, the term of this patent is extended or adjusted under 35 U.S.C. 154(b) by 0 days.

(21) Appl. No.: 16/911,381

(22) Filed: Jun. 24, 2020

(51) Int. Cl.
*G06Q 30/0601* (2023.01)
*H04L 9/40* (2022.01)
*G06Q 10/087* (2023.01)

(52) U.S. Cl.
CPC ....... *G06Q 30/0637* (2013.01); *G06Q 10/087* (2013.01); *G06Q 30/0623* (2013.01);
(Continued)

(58) Field of Classification Search
CPC .............. G06Q 30/0637; G06Q 10/087; G06Q 30/0623; G06Q 30/0631; G06Q 30/0641;
(Continued)

(56) References Cited

U.S. PATENT DOCUMENTS

| 10,963,812 | B1 * | 3/2021 | Varadarajan | .............. G06N 5/04 |
| 2007/0244758 | A1 * | 10/2007 | Xie | ..................... G06Q 30/0253 705/26.1 |

(Continued)

OTHER PUBLICATIONS

Reimers et al., Permission email marketing and its influence on online shopping, 2016, Asia Pacific Journal of Marketing and Logistics, vol. 28, Issue 2, p. 308-322 (Year: 2016).*

(Continued)

*Primary Examiner* — Allison G Wood
*Assistant Examiner* — Anna Mae Mitros
(74) *Attorney, Agent, or Firm* — Fenwick & West LLP

(57) ABSTRACT

Multiple users of a household can each have a different profile associated with a common account for an online concierge system. This association of different profiles with the common accounts allows the concierge system to show a user of the household what other users of the household purchased and rank items for suggestion to the user based one purchases of other users, facilitating order building. The online concierge system also enables a user profile to designate a user profile associated with the common account for an order pickup or as a contact for a home delivery. Additionally, association of different user profiles with the common account may be used for account recovery of one of the user profiles. Further, different user profiles may have different permissions for creating an order with the online concierge system.

10 Claims, 7 Drawing Sheets

(52) U.S. Cl.
CPC ..... *G06Q 30/0631* (2013.01); *G06Q 30/0641* (2013.01); *H04L 63/102* (2013.01); *H04L 63/104* (2013.01)

(58) Field of Classification Search
CPC .... G06Q 30/0601–0645; H04L 63/102; H04L 63/104
USPC ................................. 705/26.61, 26.1–27.2
See application file for complete search history.

(56) References Cited

U.S. PATENT DOCUMENTS

| | | | |
|---|---|---|---|
| 2009/0254446 A1* | 10/2009 | Chernyak | G06Q 30/06 705/26.1 |
| 2016/0335588 A1* | 11/2016 | Knobel | G06F 16/23 |
| 2018/0033072 A1* | 2/2018 | Karthikeyan | G06Q 30/0633 |
| 2018/0101881 A1* | 4/2018 | Tian | G06Q 40/00 |
| 2021/0019811 A1* | 1/2021 | Kassaei | G06Q 30/0601 |

OTHER PUBLICATIONS

PCT International Search Report and Written Opinion, PCT Application No. PCT/US2021/037044, dated Jul. 12, 2021, 14 pages.

* cited by examiner

METHOD AND MEDIUM FOR LEVERAGING INFORMATION ABOUT PRIOR ORDERS FROM VARIOUS USERS ASSOCIATED WITH AN ACCOUNT WHEN RECEIVING AN ORDER FROM A USER ASSOCIATED WITH THE ACCOUNT

BACKGROUND

This disclosure relates generally to users placing orders via an online concierge system, and more particularly to an online concierge system leveraging information for multiple user profiles associated with a common account with a user is placing an order via the account.

In current online concierge systems, shoppers (or "pickers") fulfill orders at a physical warehouse, such as a retailer, on behalf of users as part of an online shopping concierge service. A user adds goods to an online shopping cart from a list of goods offered by one or more retail locations via the online concierge system. These goods create the user's order, which is retrieved by a shopper at the retail location who "shops" for the user.

Conventional online concierge systems receive orders from individual users and the online concierge systems fill orders for individual users. However, many orders placed through an online concierge system are for a household or other location including multiple users. Because conventional online concierge systems are configured for individual users, conventional online concierge systems force different users at a location including multiple users to place different orders for fulfillment to the location by the online concierge system. Additionally, the configuration for individual order fulfillment results limits information the online concierge system may access to recommend goods to different users at a location including multiple users. For example, conventional online concierge systems are unable to leverage information about orders placed by other users at the location including multiple users of the online concierge system to recommend goods for inclusion in an order to a user at the location including multiple users. This may increase an amount of time for a user to place an order through the online concierge system, or increase an amount of resources allocated by the online concierge system to fulfill multiple orders from different individual users at a common location.

SUMMARY

An online concierge system generates an account associated with a user profile corresponding to a user of the online concierge system. In various embodiments, the online concierge system receives a request to generate the account from the user and generates the account in response to receiving the request from the user. Alternatively, the online concierge system prompts the user to generate the account in response to the online concierge system determining one or more conditions are satisfied. For example, in response to determining that a user profile of the user includes a physical location, such as an address, that is also included in a threshold number of other user profiles, the online concierge system transmits a prompt to the user to generate the account and generates the account in response to receiving a response to the prompt.

The online concierge system obtains information identifying a plurality of user profiles to associate with the account and stores associations between each of the plurality of user profiles and the account. In various embodiments, the online concierge system stores associations between each of a plurality of user profiles corresponding to different users of the online concierge system and the account. The user requesting the online concierge system generate the account identifies other users to associate with the account in various embodiments, allowing the user initiating generation of the account to specify other users who are associated with the account by the online concierge system.

When the online concierge system receives a request to create an order from a user corresponding to a user profile associated with the account, the online concierge system retrieves stored information identifying prior orders received from the user from whom the request was received. In various embodiments, the online concierge system stores information identifying prior orders in association with a user profile corresponding to the user from whom the request was received. The retrieved information identifies one or more items that were included in prior orders the online concierge system received from the user. In some embodiments, the online concierge system retrieves stored information identifying prior orders received form the user from whom the request was received and that satisfy one or more criteria. For example, the online concierge system retrieves information identifying prior orders the online concierge system received from the user from whom the request was received within a specific time interval (e.g., orders previously received from the user from whom the request was received within a specific time interval of a time when the request was received, orders previously received from the user from whom the request was received and fulfilled within a specific time interval of a time when the request was received).

Additionally, the online concierge system retrieves stored information identifying items previously included in one or more previous orders received from each of a set of the other users corresponding to user profiles also associated with the account. Hence, the online concierge system retrieves stored information identifying previous orders received from different users having user profiles associated with the account. From the previous orders received from the other users with corresponding user profiles associated with the account, the online concierge system retrieves stored information identifying one or more items included in one or more previous orders received from the other users having corresponding user profiles associated with the account. In some embodiments, the online concierge system retrieves stored information identifying items included in at least a threshold amount (e.g., a threshold percentage, a threshold number) of orders previously received from one or more other users having corresponding user profiles associated with the account. As another example, the online concierge system retrieves stored information identifying items included in orders received from other users having user profiles associated with the account received within a threshold time interval (e.g., previously received within a specific time interval of a time when the online concierge system received the request to create the order). The online concierge system may account for items included in the request to create the order when retrieving stored information identifying items included in one or more previous orders received from other users having user profile associated with the account. For example, the online concierge system identifies an item included in the received request, identifies one or more previous orders from other users with user profiles associated with the account that include the item, and retrieves information identifying one or more additional items included in the identified previous orders from other users with user profiles associated with the account that include the item. This allows the online concierge system to identify additional items that different users with user profiles associated with the account included in previous orders that included the item included in the request to create the order.

The online concierge system transmits an interface to a client device of the user from whom the request was received that displays information identifying one or more of the identified items included in previous orders received from other users having user profiles associated with the account. This allows the user from whom the request was received to readily view additional items that other users with user profiles associated with the account previously included with orders, enabling the user to more readily include the additional items in the order. Leveraging information about prior orders from other users with user profiles associated with the account allows the online concierge system to simplify order creation by the user from whom the request was received by more readily identifying possibly relevant items from other users having user profiles associated with the account.

In various embodiments, the interface transmitted by the online concierge system displays information identifying one or more of the identified items included in previous orders received from other users having user profiles associated with the account in conjunction with information identifying one or more items included in prior orders received form the user from whom the request was received. For example, the interface displays information identifying one or more of the identified items included in previous orders received from other users having user profiles associated with the account in a region of the interface and displays information identifying one or more items included in prior orders received form the user from whom the request was received in a different region of the interface. This allows the user from whom the request was received to easily identify items that the user previously included in orders, while also accessing items that other users with user profiles associated with the account previously included in orders.

In addition to leveraging stored information describing orders previously received from other users with user profiles associated with the account, the online concierge system may allow the other users to modify the order requested by the user. For example, the online concierge system receives an additional request from another user, different than the user from whom the request was received, to include one or more additional items in the order and includes the one or more additional items in the order. The online concierge system may transmit notifications to client devices other users with user profiles associated with the account when the request to create the order was received to allow other users with user profiles associated with the account to include items in the order. The user from whom the request to create the order was received may include a close date for the order in the request or may otherwise specify a close date for the order, and the online concierge system adds additional items included in additional requests from other users with user profiles associated with the account that are received by the online concierge system before the close date and does not include additional items included in additional requests received by the online concierge system after the close date in the order.

In various embodiments, the online concierge system maintains different permissions for association with user profiles associated with the account, where different permissions affect how a user corresponding to a user profile may modify an order requested by another user with a user profile associated with the account. The user from whom the request for an order may associate permissions with other user profiles associated with the account to regulate how other users may modify the order. For example, a permission allows a user associated with the account and other than the user from whom the request for the order was received to add items to the order, another permission allows a user associated with the account and other than the user from whom the request for the order was received to add or to remove items to the order, and another permission allows a user associated with the account and other than the user from whom the request for the order was received to complete the order, while another permission allows a user associated with the account and other than the user from whom the request for the order was received to modify logistical information for the order (e.g., a delivery address for the order, a delivery time for the order, etc.). In some embodiments, the online concierge system may maintain one or more rules that are applied to user profiles associated with the account to associate permissions with different user profiles associated with the account; the permissions associated with the user profiles by application of the rules may be default settings that different users with user profiles associated with the account modify.

Additionally, the online concierge system allows the user from whom the request to create the order was received to identify an alternative user with a user profile associated with the account to receive subsequent communications about the order or to take delivery of the items in the order when the order is fulfilled by a shopper. Further, the online concierge system may use associations between different user profiles and the account to allow a user having a user profile associated with the account to access the account. For example, if a user with a user profile associated with the account is unable to provide authentication information for accessing the account to the online concierge system, the online concierge system transmits a request to a different user with a user profile associated with the account identifying the user and indicating the user is attempting to access the account. In response to the different user transmitting an authorization for the user to access the account to the online concierge system, the online concierge system authorizes the user to access the account.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
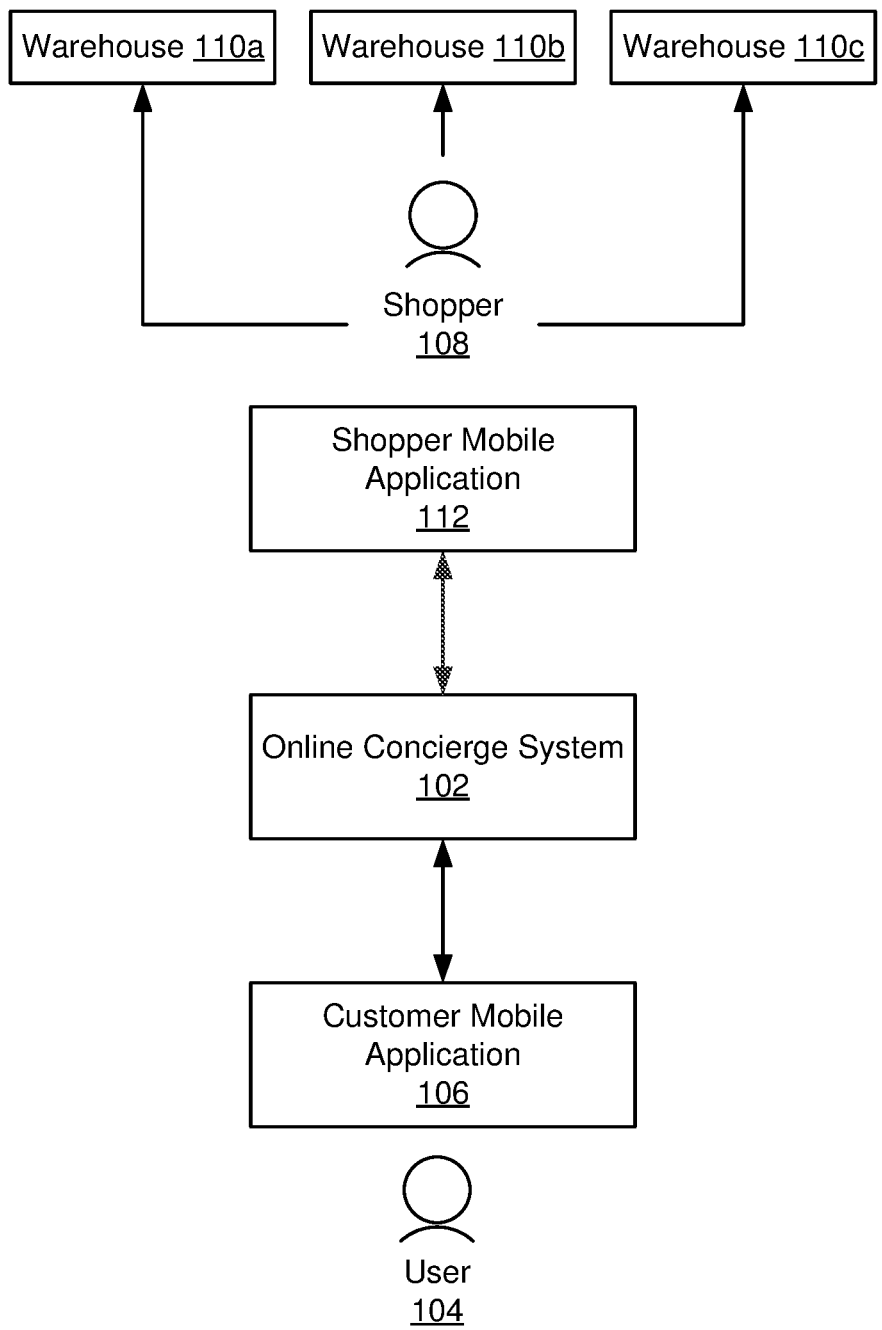
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, or other person (or entity) who is enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
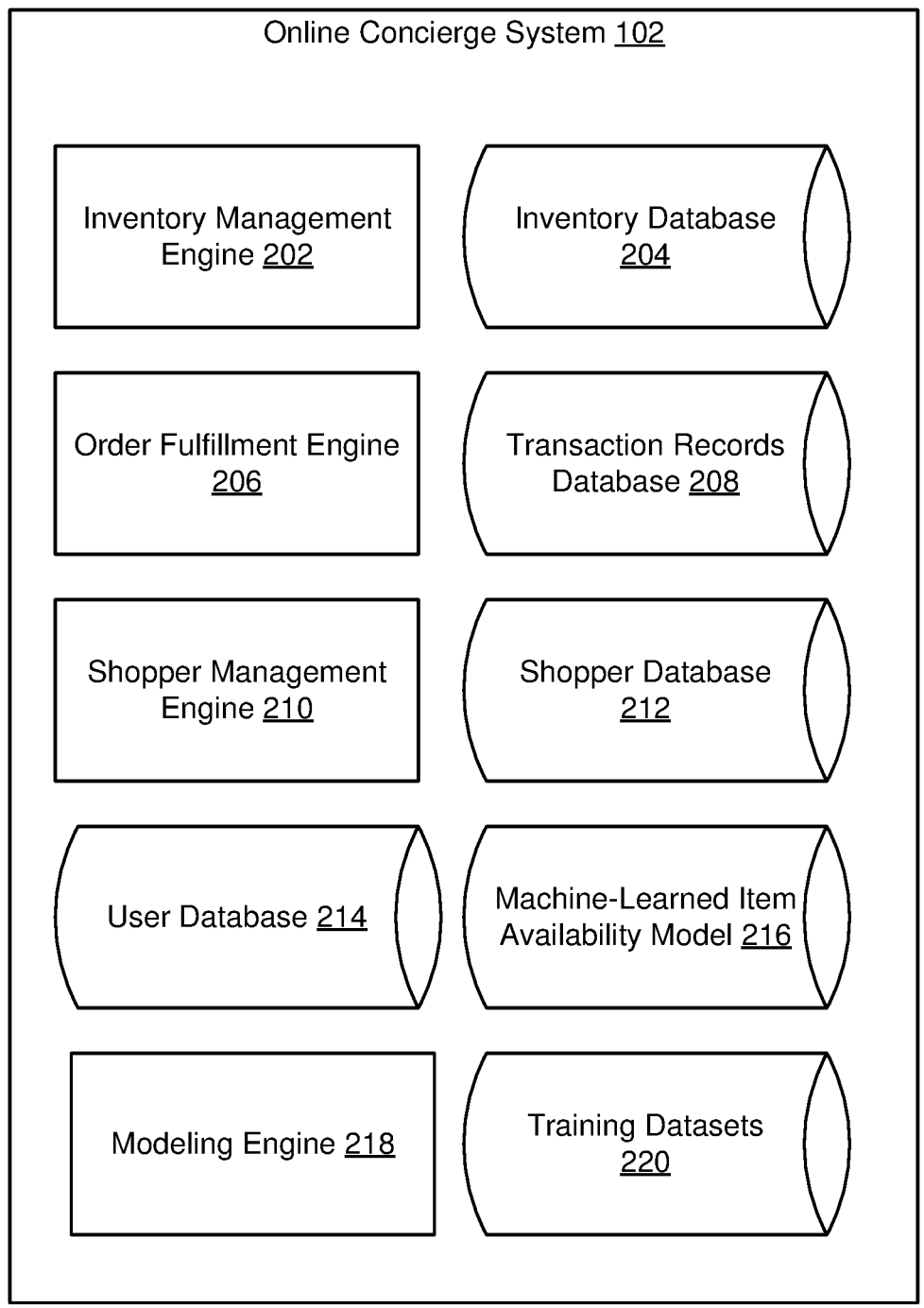
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on. In various embodiments, the user database 214 includes a user profile for each user, with a user profile corresponding to a user including the user's name, address, gender, items included in one or more prior orders, payment instructions, or other information. A user profile corresponding to a user also includes information uniquely identifying the user.

In various embodiments, the user database 214 also includes one or more accounts and associations between user profiles and accounts. For example, an account corresponds to a physical location (e.g., an address) and is associated with one or more user profiles. As further described below in conjunction with FIG. 6, a user may identify an account to the online concierge system 102 as well as other user profiles to associate with the account, and the online concierge system 102 stores associations between the account and other user profiles identified by the user. In various embodiments, the account includes a physical location (e.g., an address), delivery instructions for orders identifying the physical location, and other information for the physical location. As further described below in conjunction with FIG. 6, the order fulfillment engine 206 may leverage associations between different user profiles and the account to retrieve information about previously received orders from multiple users with user profiles associated with the account. This allows the order fulfillment engine 206 to provide a user with a user profile associated with the account with items that other users with other user profiles associated with the account included in previously received orders, providing a user with a user profile associated with the account with additional recommendations for items to include in an order created by the user, as further described below in conjunction with FIG. 6.

Machine Learning Model

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user, or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database, and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability, and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items, or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked, and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others, or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability, and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108, as described in further detail with reference to FIG. 5. Following updating of the training datasets 220, a modeling engine 218 may retrain a model with the updated training datasets 220, and produce a new machine-learned item availability model 216.

Customer Mobile Application

Figure 3A:
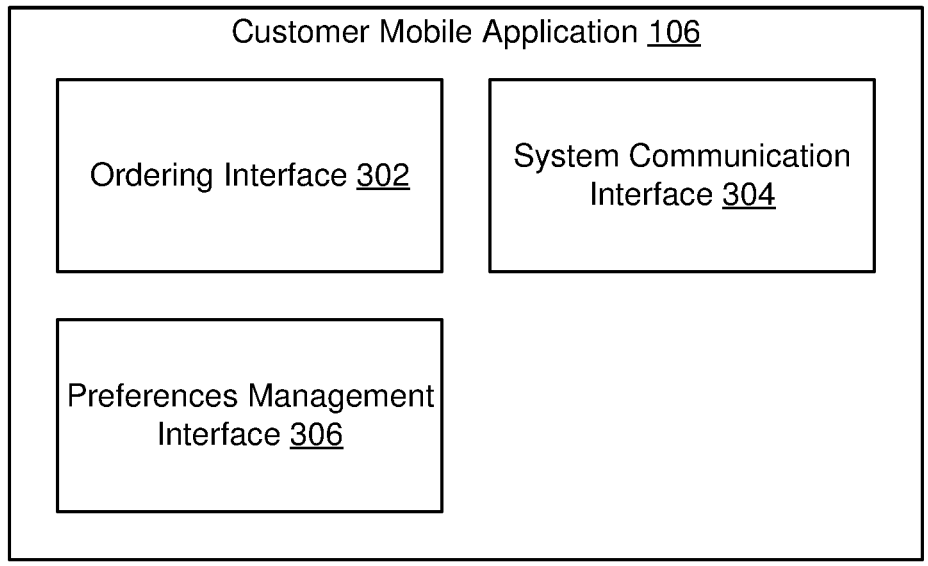
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
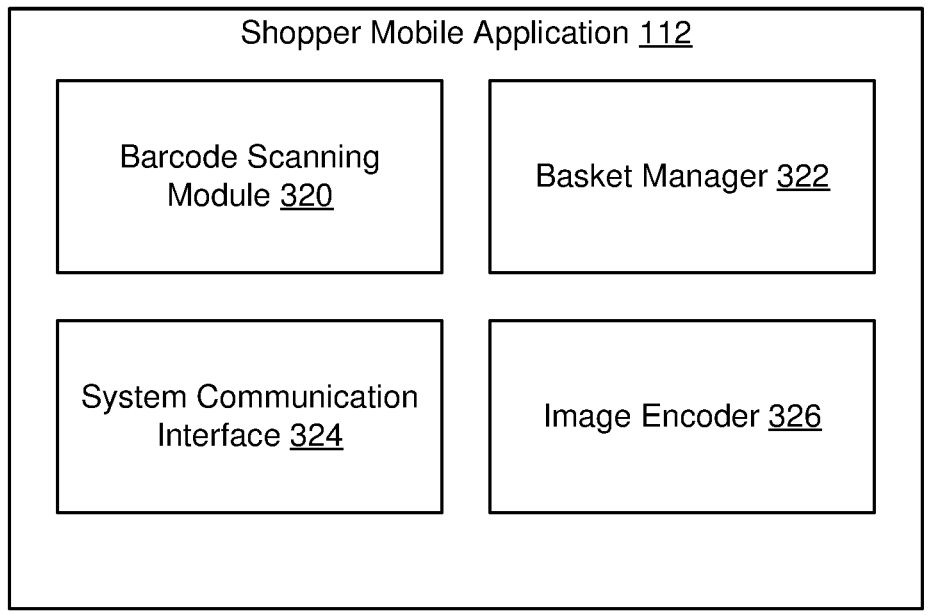
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
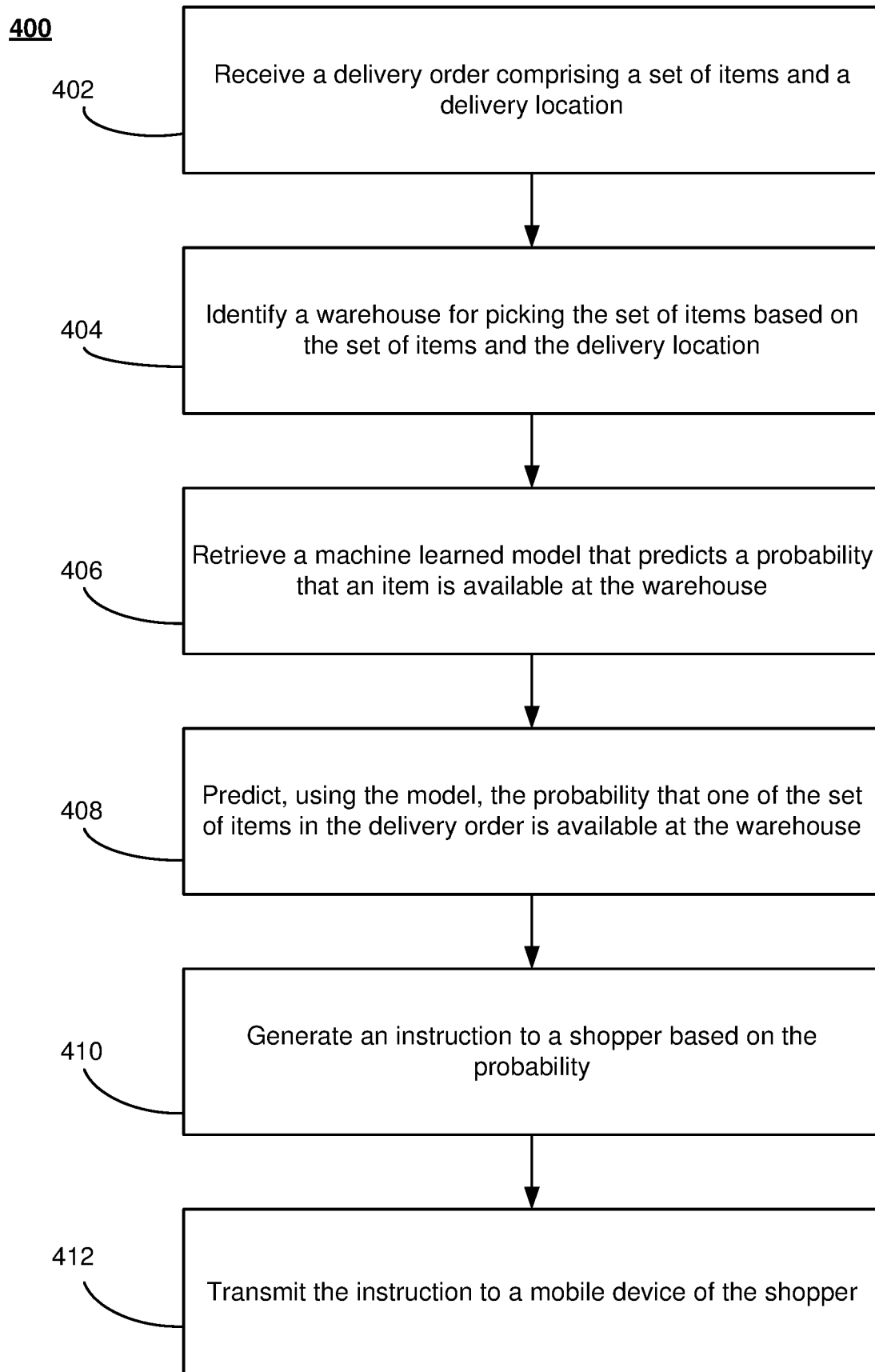
FIG. 4 is a flowchart of a process for predicting inventory availability, according to one embodiment.

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. Other examples of the shopper management engine 210 instruction to the shopper are described in further detail with reference to FIGS. 5 and 6. In some other examples, the order fulfillment engine 206 sends a message and/or instruction to a user based on the probability predicted by the machine-learned item availability model 216.

Updating the Training Datasets

Figure 5:
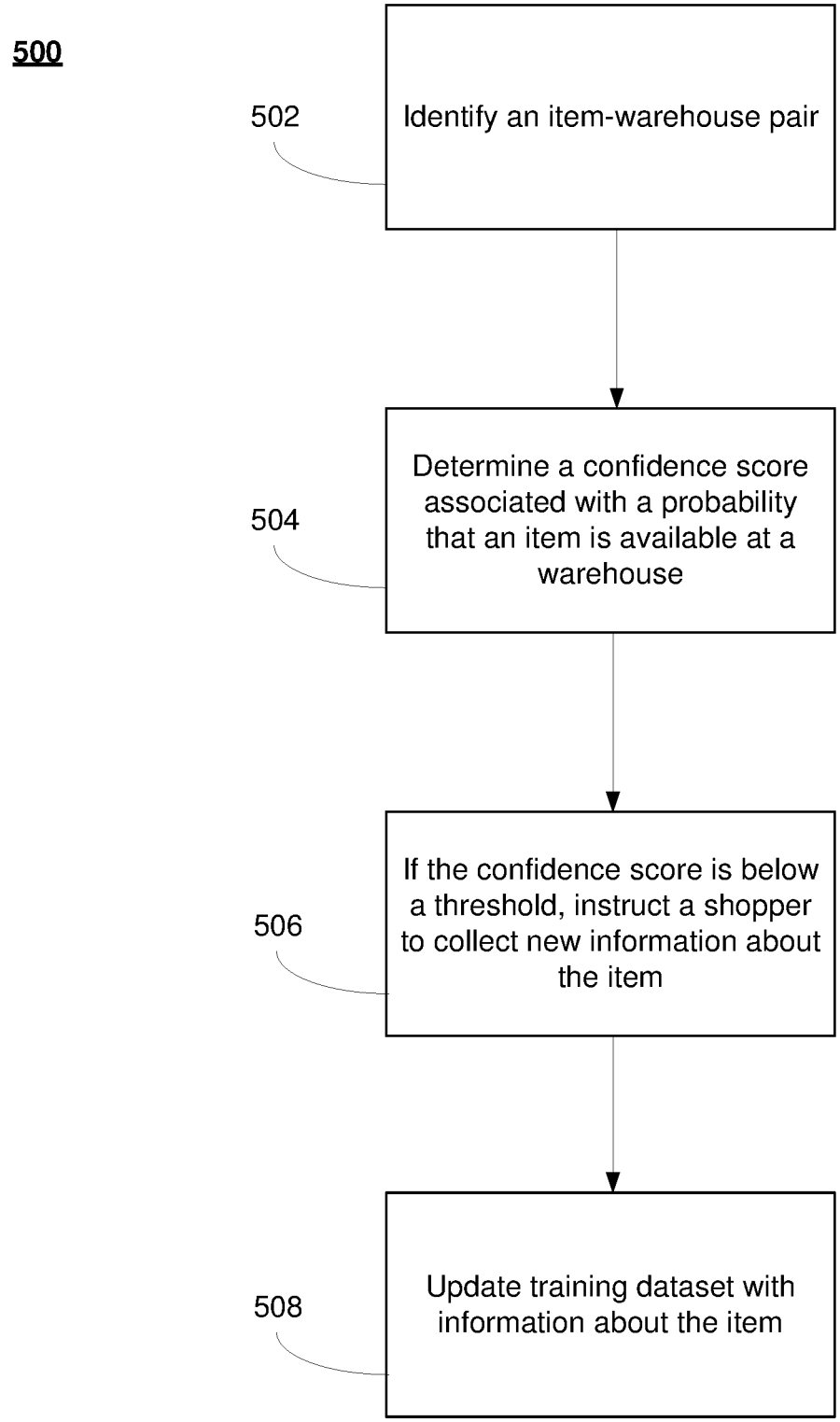
FIG. 5 is a flowchart of a process for updating training datasets for a machine-learned model, according to one embodiment.

FIG. 5 is a flowchart illustrating a process 500 for updating training datasets for a machine-learned model, according to one embodiment. The training datasets may be the training datasets 220 as shown in FIG. 2. While the training datasets 220 include large datasets of information collected from previous delivery orders (e.g., information identifying items and whether the items were available at a warehouse), certain items or warehouses might have less information associated with them in the training datasets 220 than other items or warehouses. For example, if an item is not frequently ordered, or has not been ordered for a long period of time, then it may be more difficult to build an accurate availability prediction in the machine-learned item availability model 216. One way to improve the ability of the machine-learned item availability model 216 to accurately predict item availability is to increase the information about the item in the training datasets 220, and add new information. With larger and/or more recent datasets on the item, the modeling engine 218 can build more statistically meaningful connections between the machine-learning factors described with reference to FIG. 2 and the predicted item availability.

Process 500 thus improves the machine-learned item availability model 216 by increasing the datasets for particular items in the training datasets 220 with low confidence scores. Process 500 may be carried out by the online concierge system 102, e.g., by the inventory management engine 202 in conjunction with the shopper management engine 210, the item availability model 216, and the modeling engine 218. In some examples, process 500 is carried out by the online concierge system 102 following retrieving 406 a machine-learned model that predicts a probability that an item is available at a warehouse, as described in FIG. 4.

The online concierge system 102 (e.g., the inventory management engine 202 using the item availability model 216) identifies 502 an item-warehouse pair. For example, the item and warehouse in the item-warehouse pair may be an item in a received order and warehouse or potential warehouse for picking the items from the received order, e.g., to evaluate the suitability of the warehouse or likelihood of successfully picking the order before the order is picked.

As another example, the item-warehouse pair may be identified from items for which the availability predicted by the machine-learned item availability model 216 was incorrect (e.g., the item was predicted to be available and was determined by the shopper to be out of stock, or the item was predicted to be unavailable and the shopper was able to find it in the warehouse). For items for which the availability prediction was incorrect, the online concierge system 102 may determine if the items have sufficient associated information within the training datasets 220. If the online concierge system 102 determines that the incorrect probability was a result of insufficient or stale information in the training datasets 220, it may identify item-warehouse pairs and carry out process 500 to update the training datasets 220.

Additionally, or alternatively, item-warehouse pairs are identified from new items offered by the online concierge system 102. For new items, there may not be previous delivery order information relating the item availability to item characteristics, delivery order information, or time information in the training datasets 220. The lack of previous delivery orders may lead to a low confidence score for new items. The inventory management engine 202 may initiate the process 500 for new items until sufficient information about the items are collected in the training datasets 220 to improve the item availability confidence score associated with the items.

The online concierge system 102 (e.g., the inventory management engine 202 using the machine-learned item availability model 216) inputs the item, warehouse, and timing characteristics for the identified item-warehouse pair into the machine-learned item availability model 216 and determines 504 a confidence score associated with a probability that an item is available at the warehouse. The online concierge system 102 may determine probabilities and/or confidence scores for all or selected items in an inventory, e.g., items that are expected to be picked based on already-received orders, sales, promotions, holidays, weather, historical trends, or other factors. The confidence score is generated along with the item availability probability (also referred to as "availability") by the machine-learned item availability model 216. The confidence score may be an error associated with the availability probability. The confidence score indicates items that may not have enough training data in the training datasets 220 to generate a statistically significant link between the item's availability and information from the delivery order and/or item characteristics. In some alternate embodiments, the online concierge system 102 may identify, using the item availability model 216, item-warehouse pairs with a low confidence score, e.g., all item-warehouse pairs with a confidence score below a particular threshold. This list of item-warehouse pairs may be filtered, e.g., based on item popularity, predicted items to be ordered, warehouse, or one or more other factors.

In response to the determined confidence level of an item-warehouse pair being below a threshold, the online concierge system 102 (e.g., the shopper management engine 210) instructs 506 the shopper to collect new information about items with a confidence score below a threshold. A confidence score threshold may be an item availability probability between 0 and 1. A threshold confidence score may be 0.3, such that in response to a confidence score below 0.3, the shopper is instructed to collect new information about an item. In some embodiments, the online concierge system 102 also considers the availability probability for the item-warehouse pair. For example, if an item-warehouse pair has a confidence level slightly below the threshold, but a very low or very high availability probability, the online concierge system 102 may determine not to collect new information about the item-warehouse pair. In some embodiments, the threshold used for the confidence score may depend on the availability probability, or vice versa.

In response to the instruction, the shopper 108 determines whether the item is available at the warehouse. The shopper may be instructed to try to find the item at the warehouse, and indicate, through the SMA 112, whether the item is available. This information is transmitted to the online concierge system 102 via the shopper management engine 210, and used to update 508 the training datasets 220. In some embodiments, a shopper may be given a list of items with low confidence scores to seek within the warehouse. The online concierge system 102 updates 508 the training dataset 220 with new information about the item, which includes whether or not the item is available in the warehouse, and any additional item characteristics, warehouse information, or time information as described with respect to FIG. 2. The online concierge system 102 also updates the inventory database 204 based on the received information; e.g., if the inventory database 204 stores the time at which the item was most recently found or not found, this time will be updated based on the input from the shopper 108. In response to the new information collected by the shopper, the modeling engine 218 may update or retrain the machine learning item availability model 216 with the updated training datasets 220. Process 500 may be carried out by the online concierge system 102 until a confidence score associated with a probability that an item is available is above a threshold.

Use Case Examples

An example of process 500 used in conjunction with process 400 is described below. The online concierge system 102 receives 402 a delivery order from a user 104 through the CMA 106. The user 104 schedules a delivery at their home of three items to be delivered the following day. As an example, the user 104 may order grated mozzarella, pizza dough, and tomato sauce, each of which is included in the delivery order. The online concierge system 102 sends the delivery order to the order fulfillment engine 206. The order fulfillment engine 206 uses the inventory management engine 202 and user database 214 to identify 404 a warehouse for picking the requested items based on the items and the delivery location (i.e., the user's home). A number of possible warehouses may be identified. For each possible warehouse, the order fulfillment engine 206 identifies 502 an item-warehouse pair with one of the items in the delivery order. Thus, a set of item-warehouse pairs is identified for each of the grated mozzarella, pizza dough and tomato sauce. The online concierge system 102 retrieves 406 the machine-learned item availability model 216 that predicts a probability that an item is available at the warehouse. The online concierge system 102 inputs the item, warehouse, and timing characteristics for each of the identified item-warehouse pairs into the machine-learned item availability model 216. The machine-learned item availability model 216 predicts 408 the probability that each of the grated mozzarella, pizza dough and tomato sauce are available at the identified warehouses. For each of the availability probabilities, the online concierge system 102 also determines 504 a confidence score associated with the probability from the machine-learned item availability model 216.

It is possible that the confidence score for pizza dough confidence score at one or more of the warehouses is below a threshold, given that people frequently make their own pizza dough and it may not be frequently ordered. Thus, pizza dough may have a relatively small and/or old associated dataset in the training dataset 220, leading to a low confidence score on the pizza dough availability probability within the machine-learned item availability model 216. The online concierge system 102, using the shopper management engine 210, instructs 506 a shopper to collect new information about pizza dough at one or more of the warehouses. The shopper management engine 210 may identify an off-duty shopper, or a shopper already at one of the warehouses identified 502 in an item-warehouse pair to collect information about whether or not pizza dough is available at the warehouse. The shopper management engine 210 transmits this instruction through the SMA 112. The shopper 108 may find that pizza dough is in fact available, and transmit the availability to the online concierge system 102 through the SMA 112. This new information is used to update 508 the training dataset 220 and the inventory database 204. The shopper management engine 210 may transmit the same instruction to multiple shoppers 108 at different warehouses, or at different times, such that there is a larger set of data about pizza dough availability added to the training dataset 220, and more recent data in the inventory database 204.

In this example, the modeling engine 218 uses the updated training datasets 220 to retrain the machine-learned item availability model 216. The online concierge system 102 then re-inputs the pizza dough-warehouse pairs into the updated machine-learned item availability model 216 and determines 504 a confidence score associated with the probability that pizza dough is available at a number of possible warehouses. It is possible that the confidence scores are now above a threshold, because the increased data about pizza dough added to the training datasets 220 has improved the machine-learned item availability model 216, and/or the newer data in the inventory database 204 has improved the confidence score. The online concierge system 102 then generates 410 an instruction to a shopper 108 based on the availability probabilities for pizza dough. The instruction may be to pick the pizza dough at the warehouse with the highest availability probability. In other examples, the instruction may be to pick the pizza dough, grated mozzarella and tomato sauce at a warehouse with the highest availability probability for all of these items in the user's delivery order. The online concierge system 102 transmits the instruction to a mobile device of the shopper 108.

Additionally, or alternatively, the online concierge system 102 may use the machine-learned item availability model 216 to predict an anticipated demand for an item at a warehouse. The online concierge system 102 may compare the number of times an item is included in a set of delivery orders to the item availability predictions generated by the machine-learned item availability model 216, and identify items that are frequently ordered but have low corresponding availability probabilities. For example, around the holidays, there may be an increase in delivery orders including Brussels sprouts, whereas Brussels sprouts may have a low availability prediction since they are not typically stocked in large quantities. The online concierge system may identify the discrepancy between a large volume of item orders and the low availability probability and convey this information to a warehouse 110. Additionally, or alternatively, the online concierge system 102 may transmit information about items that have availability predictions below a threshold.

Figure 6:
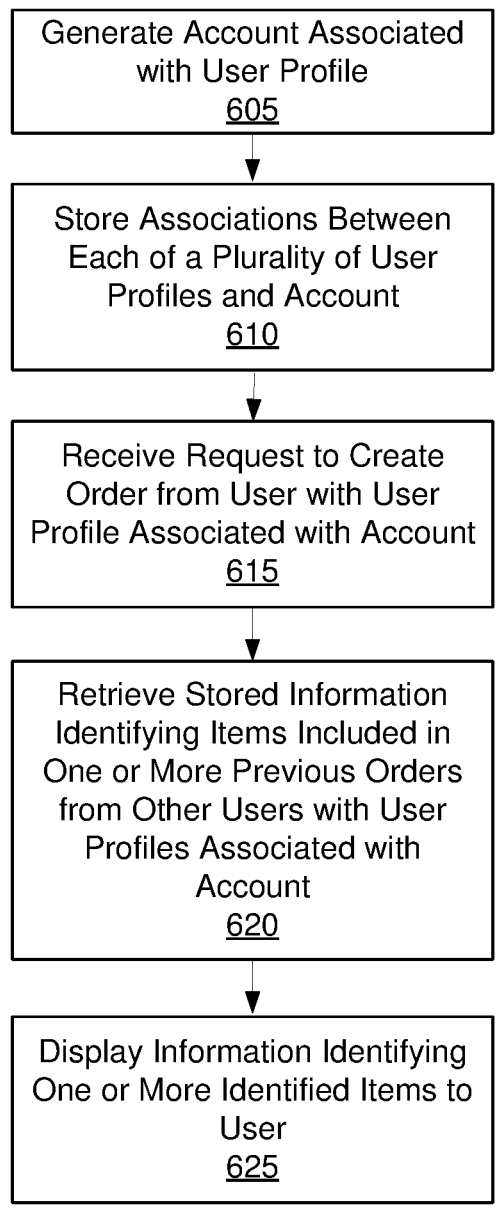
FIG. 6 is a flowchart of a method for maintaining multiple user profiles associated with a common account at an online concierge system, according to one embodiment.

Leveraging Multiple User Profiles Associated with a Common Account for Order Configuration FIG. 6 is a flowchart of one embodiment of a method for maintaining multiple user profiles associated with a common account at an online concierge system 102. The method may be carried out by the online concierge system 102 (e.g., the order fulfillment engine 206) communicating with a user via the CMA 106. In various embodiments, the process performs the steps described in conjunction with FIG. 6 in a different order than the order shown in FIG. 6. Further, in some embodiments, the process includes different or additional steps than those described in conjunction with FIG. 6.

The online concierge system 102 generates 605 an account associated with a user profile corresponding to a user of the online concierge system 102. In various embodiments, the online concierge system 102 receives a request to generate the account from the user and generates 605 the account in response to receiving the request from the user. Alternatively, the online concierge system 102 prompts the user to generate 605 the account in response to the online concierge system 102 determining one or more conditions are satisfied. For example, in response to determining that a user profile of the user includes a physical location, such as an address, that is also included in a threshold number of other user profiles, the online concierge system 102 transmits a prompt to the user to generate 605 the account and generates 605 the account in response to receiving a response to the prompt.

The online concierge system 102 obtains information identifying a plurality of user profiles to associate with the account and stores 610 associations between each of the plurality of user profiles and the account. In various embodiments, the online concierge system 102 stores 610 associations between each of a plurality of user profiles corresponding to different users of the online concierge system 102 and the account. The user requesting the online concierge system 102 generate 605 the account identifies other users to associate with the account in various embodiments, allowing the user initiating generation of the account to specify other users who are associated with the account by the online concierge system 102.

When the online concierge system 102 receives 615 a request to create an order from a user corresponding to a user profile associated with the account, the online concierge system 102 retrieves stored information identifying prior orders received from the user from whom the request was received 615. In various embodiments, the online concierge system 102 stores information identifying prior orders in association with a user profile corresponding to the user from whom the request was received 615. The retrieved information identifies one or more items that were included in prior orders the online concierge system 102 received from the user. In some embodiments, the online concierge system 102 retrieves stored information identifying prior orders received form the user from whom the request was received and that satisfy one or more criteria. For example, the online concierge system 120 retrieves information identifying prior orders the online concierge system 102 received from the user from whom the request was received 615 within a specific time interval (e.g., orders previously received from the user from whom the request was received 615 within a specific time interval of a time when the request was received 615, orders previously received from the user from whom the request was received 615 and fulfilled within a specific time interval of a time when the request was received 615).

Additionally, the online concierge system 102 retrieves 620 stored information identifying items previously included in one or more previous orders received from each of a set of the other users corresponding to user profiles also associated with the account. Hence, the online concierge system 120 retrieves stored information identifying previous orders received from different users having user profiles associated with the account. From the previous orders received from the other users with corresponding user profiles associated with the account, the online concierge system 102 retrieves 620 stored information identifying one or more items included in one or more previous orders received from the other users having corresponding user profiles associated with the account. In some embodiments, the online concierge system 102 retrieves 620 stored information identifying items included in at least a threshold amount (e.g., a threshold percentage, a threshold number) of orders previously received from one or more other users having corresponding user profiles associated with the account. As another example, the online concierge system 102 retrieves 620 stored information identifying items included in orders received from other users having user profiles associated with the account received within a threshold time interval (e.g., previously received within a specific time interval of a time when the online concierge system 102 received 615 the request to create the order). The online concierge system 102 may account for items included in the request to create the order when retrieving 620 stored information identifying items included in one or more previous orders received from other users having user profile associated with the account. For example, the online concierge system 102 identifies an item included in the received request, identifies one or more previous orders from other users with user profiles associated with the account that include the item, and retrieves 620 information identifying one or more additional items included in the identified previous orders from other users with user profiles associated with the account that include the item. This allows the online concierge system 102 to identify additional items that different users with user profiles associated with the account included in previous orders that included the item included in the request to create the order.

The online concierge system 102 transmits an interface to a client device of the user from whom the request was received 615 that displays 625 information identifying one or more of the identified items included in previous orders received from other users having user profiles associated with the account. This allows the user from whom the request was received 615 to readily view additional items that other users with user profiles associated with the account previously included with orders, enabling the user to more readily include the additional items in the order. Leveraging information about prior orders from other users with user profiles associated with the account allows the online concierge system 102 to simplify order creation by the user from whom the request was received 615 by more readily identifying possibly relevant items from other users having user profiles associated with the account.

In various embodiments, the interface transmitted by the online concierge system 102 displays 625 information identifying one or more of the identified items included in previous orders received from other users having user profiles associated with the account in conjunction with information identifying one or more items included in prior orders received form the user from whom the request was received 615. For example, the interface displays 625 information identifying one or more of the identified items included in previous orders received from other users having user profiles associated with the account in a region of the interface and displays information identifying one or more items included in prior orders received form the user from whom the request was received 615 in a different region of the interface. This allows the user from whom the request was received 615 to easily identify items that the user previously included in orders, while also accessing items that other users with user profiles associated with the account previously included in orders. Alternatively, the interface has a common region displaying 625 information identifying one or more of the identified items included in previous orders received from other users having user profiles associated with the account in a region of the interface information identifying one or more items included in prior orders received form the user from whom the request was received 615 in a different region of the interface; however, the interface also displays a visual indication in conjunction with information identifying items that were included in a previous order received from another user having a user profile associated with the account (or displays a visual indication in conjunction with information identifying items that were included in a prior order from the user from whom the request was received 615).

Figure 7:
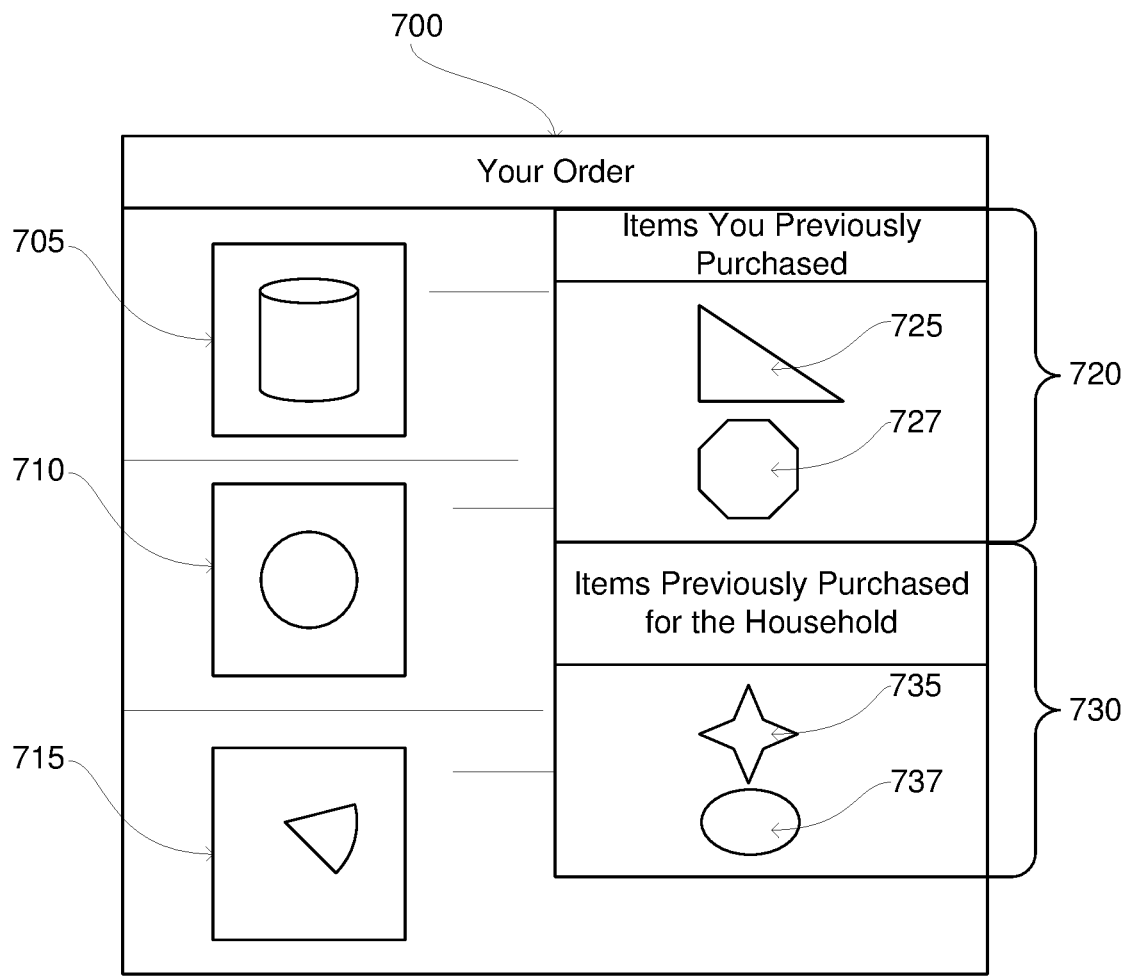
FIG. 7 is an example interface displayed by a customer mobile application including information about items from prior orders received from other users associated with an account, according to one embodiment.

FIG. 7 example interface 700 displayed by a customer mobile application 106 including information about items from prior orders received from other users associated with an account. In the example of FIG. 7, the interface 700 includes information identifying items 705, 710, 715 included in the order by a user who has a user profile associated with an account by the online concierge system 102. Additionally, the interface 700 includes a region 720 displaying information identifying items 725, 727 that the user included in prior orders received by the online concierge system 102 from the user. The region 720 allows the user to more easily select items 725, 727 that the user has previously included in other orders in the current order.

As further described above in conjunction with FIG. 6, other user profiles corresponding to different users are also associated with the account by the online concierge system 102. The online concierge system 102 retrieves stored information describing orders previously received from other users with user profiles associated with the account and retrieves information identifying items included in one or more of the orders previously received from the other users with user profiles associated with the account. The interface 700 includes a region 730 displaying information identifying items 735, 737 that were included in orders previously received from the other users having user profiles associated with the account; as shown in FIG. 7, the region 730 is different than the region 720 displaying information identifying items 725, 727 that the user creating the order included in prior orders. In some embodiments, the region 730 displays a specific number of items 735, 737 included in orders previously received from other users with user profiles associated with the account, while in other embodiments, the region 730 displays any suitable number of items 735, 737 that were included in orders previously received from other users with user profiles associated with the account.

Referring back to FIG. 6, in addition to leveraging stored information describing orders previously received from other users with user profiles associated with the account, the online concierge system 102 may allow the other users to modify the order requested by the user. For example, the online concierge system 102 receives an additional request from another user, different than the user from whom the request was received 615, to include one or more additional items in the order and includes the one or more additional items in the order. The online concierge system 102 may transmit notifications to client devices other users with user profiles associated with the account when the request to create the order was received 615 to allow other users with user profiles associated with the account to include items in the order. The user from whom the request to create the order was received 615 may include a close date for the order in the request or may otherwise specify a close date for the order, and the online concierge system 102 adds additional items included in additional requests from other users with user profiles associated with the account that are received by the online concierge system 102 before the close date. However, when a close date is specified for the order, the online concierge system 102 does not include additional items included in additional requests received by the online concierge system 102 after the close date in the order. This allows the user from whom the request to create the order was received 615 to limit a length of time when other users with user profiles associated with the account may include additional items in the order.

In various embodiments, the online concierge system 102 maintains different permissions for association with user profiles associated with the account, where different permissions affect how a user corresponding to a user profile may modify an order requested by another user with a user profile associated with the account. The user from whom the request for an order 615 may associate permissions with other user profiles associated with the account to regulate how other users may modify the order. For example, a permission allows a user associated with the account and other than the user from whom the request for the order was received 615 to add items to the order, another permission allows a user associated with the account and other than the user from whom the request for the order was received 615 to add or to remove items to the order, and another permission allows a user associated with the account and other than the user from whom the request for the order was received 615 to complete the order, while another permission allows a user associated with the account and other than the user from whom the request for the order was received 615 to modify logistical information for the order (e.g., a delivery address for the order, a delivery time for the order, etc.). In some embodiments, the online concierge system 102 may maintain one or more rules that are applied to user profiles associated with the account to associate permissions with different user profiles associated with the account; the permissions associated with the user profiles by application of the rules may be default settings that different users with user profiles associated with the account modify.

Additionally, the online concierge system 102 allows the user from whom the request to create the order was received 615 to identify an alternative user with a user profile associated with the account to receive subsequent communications about the order or to take delivery of the items in the order when the order is fulfilled by a shopper. For example, the user form whom the order was received 615 provides a selection of an alternative user with a corresponding user profile associated with the account to the online concierge system 102, which stores an indication to contact the alternative user about the order in association with the order. This allows the user from whom the request to create the order was receive 615 to identify an alternative user with a user profile associated with the account to receive the items in the order when a shopper fulfills the order.

Further, the online concierge system 102 may use associations between different user profiles and the account to allow a user having a user profile associated with the account to access the account. For example, if a user with a user profile associated with the account is unable to provide authentication information for accessing the account to the online concierge system 102, the online concierge system 102 transmits a request to a different user with a user profile associated with the account identifying the user and indicating the user is attempting to access the account. In response to the different user transmitting an authorization for the user to access the account to the online concierge system 102, the online concierge system 102 authorizes the user to access the account. However, in response to the different user transmitting a rejection to access the account to the online concierge system 102, the online concierge system 102 prevents the user from accessing the account.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
generating an account at an online concierge system;
storing associations between each of a plurality of user profiles and the account, each user profile corresponding to a different user of the online concierge system;
receiving a request to create an order including one or more items from a user of the online concierge system corresponding to a user profile associated with the account;
retrieving stored information identifying items previously included in one or more previous orders received from each of a set of other users corresponding to other user profiles also associated with the account and different than the user from whom the request was received;
retrieving stored information identifying items previously included in one or more prior orders received from the user from whom the request was received;
determining, by using a machine learned model, a predicted availability of each of the identified items previously included in one or more previous orders received from each of the set of other users and each of the identified items previously included in one or more prior orders received from the user, wherein the machine learned model is trained by:
   accessing a training dataset including plurality of training examples, wherein each training example comprises outcome information associated with an outcome of a previous delivery order and a set of input features comprising: a time and a warehouse associated with a previous; and
   updating the machine learned model for each training example by:
      applying the machine learned model to the training example; and
      updating the machine learned model based on an error between the outcome information and output of the machine learned model from the applying;
selecting, based on the predicted availability, one or more of the identified items previously included in one or more previous orders received from each of the set of other users and one or more items previously included in one or more prior orders received from the user for display;
displaying an interface to the user from whom the request was received, the interface displaying the selected one or more items included in the order by the user from whom the request was received, the interface also including a region displaying a plurality of user interface elements, each user interface element allowing a user to add one of the selected one or more of the identified items previously included in the one or more previous orders received from each of the set of other users to the user from whom the request was received and including a different region displaying a plurality of user interface elements, each user interface element allowing a user to add one of the selected one or more items previously included in the one or more prior orders received from the user to the user from whom the request was received;
transmitting a notification of the order from the online concierge system to client devices associated with each of at least the set of other users having corresponding user profiles associated with the account;
receiving an additional request to include one or more additional items in the order from another user having a corresponding user profile associated with the account; and
including the one or more additional items in the order in response to determining the online concierge system received the additional request before a close date for the order specified by the user from whom the request to create the order was received.

2. The method of claim 1, wherein displaying information identifying one or more of the identified items and the information identifying one or more items previously included in one or more prior orders received from the user in the interface displayed to the user from whom the request was received comprises:
displaying an indication in conjunction with each of the identified items that an identified item was included in a previous order received from another user having a user profile associated with the account different from the user from whom the request was received.

3. The method of claim 1, further comprising:
receiving a selection of an alternative user having a corresponding user profile associated with the account from the user; and
storing an indication to contact the alternative user regarding fulfillment of the order at the online concierge system.

4. The method of claim 1, wherein the online concierge system maintains different permissions for different user profiles associated with the account, one or more of the permissions regulating modifications to the order by users corresponding to user profiles associated with the account.

5. The method of claim 1, further comprising:
receiving, at the online concierge system, a request from an additional user corresponding to a user profile associated with the account, the additional user different than the user;
transmitting a request to the user identifying the additional user and indicating the additional user is requesting access to the account; and
authorizing the additional user to access the account in response to the online concierge system receiving an authorization for the additional user to access the account from the user.

6. A computer program product comprising a non-transitory computer-readable storage medium having instructions encoded thereon that, when executed by a processor, cause a processor to:
generate an account at an online concierge system;
store associations between each of a plurality of user profiles, each user profile corresponding to a different user of the online concierge system;
receive a request to create an order including one or more items from a user of the online concierge system corresponding to a user profile associated with the account;
retrieve stored information identifying items previously included in one or more previous orders received from each of a set of other users corresponding to other user profiles also associated with the account and different than the user from whom the request was received;
retrieving stored information identifying items previously included in one or more prior orders received from the user from whom the request was received;
determining, by using a machine learned model, a predicted availability of each of the identified items previously included in one or more previous orders received from each of the set of other users and each of the identified items previously included in one or more prior orders received from the user, wherein the machine learned model is trained by:
accessing a training dataset including plurality of training examples, wherein each training example comprises outcome information associated with an outcome of a previous delivery order and a set of input features comprising: a time and a warehouse associated with a previous order; and
updating the machine learned model for each training example by:
applying the machine learned model to the training example; and
updating the machine learned model based on an error between the outcome information and output of the machine learned model from the applying;
selecting, based on the predicted availability, one or more of the identified items previously included in one or more previous orders received from each of the set of other users and one or more items previously included in one or more prior orders received from the user for display;
display an interface to the user from whom the request was received, the interface displaying the selected one or more items included in the order by the user from whom the request was received, the interface also including a region displaying a plurality of user interface elements, each user interface element allowing a user to add one of the selected one or more of the identified items previously included in the one or more previous orders received from each of the set of other users to the user from whom the request was received and including a different region displaying a plurality of user interface elements, each user interface element allowing a user to add one of the selected one or more items previously included in the one or more prior orders received from the user to the user from whom the request was received;
transmitting a notification of the order from the online concierge system to client devices associated with each of at least the set of other users having corresponding user profiles associated with the account;
receiving an additional request to include one or more additional items in the order from another user having a corresponding user profile associated with the account; and
including the one or more additional items in the order in response to determining the online concierge system received the additional request before a close date for the order specified by the user from whom the request to create the order was received.

7. The computer program product of claim 6, wherein display information identifying one or more of the identified items and the information identifying one or more items previously included in one or more prior orders received from the user in the interface displayed to the user from whom the request was received comprises:
display an indication in conjunction with each of the identified items that an identified item was included in a previous order received from another user having a user profile associated with the account different from the user from whom the request was received.

8. The computer program product of claim 6, wherein the non-transitory computer readable storage medium further has instructions encoded thereon that, when executed by the processor, cause the processor to:
receive a selection of an alternative user having a corresponding user profile associated with the account from the user; and
store an indication to contact the alternative user regarding fulfillment of the order at the online concierge system.

9. The computer program product of claim 6, wherein the online concierge system maintains different permissions for different user profiles associated with the account, one or more of the permissions regulating modifications to the order by users corresponding to user profiles associated with the account.

10. The computer program product of claim 6, wherein the non-transitory computer readable storage medium further has instructions encoded thereon that, when executed by the processor, cause the processor to:
receive, at the online concierge system, a request from an additional user corresponding to a user profile associated with the account, the additional user different than the user;
transmit a request to the user identifying the additional user and indicating the additional user is requesting access to the account; and
authorize the additional user to access the account in response to the online concierge system receiving an authorization for the additional user to access the account from the user.

* * * * *